(12) United States Patent
Satou et al.

(10) Patent No.: US 8,121,393 B2
(45) Date of Patent: Feb. 21, 2012

(54) PATTERN DEFECT ANALYSIS EQUIPMENT, PATTERN DEFECT ANALYSIS METHOD AND PATTERN DEFECT ANALYSIS PROGRAM

(75) Inventors: Norio Satou, Hitachiota (JP); Susumu Koyama, Hitachinaka (JP); Masashi Sakamoto, Hitachinaka (JP); Kenji Obara, Kawasaki (JP)

(73) Assignee: Hitachi High-Technologies Corporation, Tokyo (JP)

( * ) Notice: Subject to any disclaimer, the term of this patent is extended or adjusted under 35 U.S.C. 154(b) by 517 days.

(21) Appl. No.: 12/350,783

(22) Filed: Jan. 8, 2009

(65) Prior Publication Data

US 2009/0180680 A1    Jul. 16, 2009

(30) Foreign Application Priority Data

Jan. 15, 2008    (JP) .................................. 2008-006163

(51) Int. Cl.
*G06K 9/00* (2006.01)
(52) U.S. Cl. ...................................................... 382/144
(58) Field of Classification Search .................. 382/141, 382/144, 145, 149; 348/125, 129, 130; 356/237.1–237.5
See application file for complete search history.

(56) References Cited

U.S. PATENT DOCUMENTS

| | | | |
|---|---|---|---|
| 6,064,484 A * | 5/2000 | Kobayashi et al. | 356/390 |
| 6,365,425 B1 | 4/2002 | Ikota et al. | |
| 6,621,571 B1 * | 9/2003 | Maeda et al. | 356/237.5 |
| 7,116,816 B2 * | 10/2006 | Tanaka et al. | 382/149 |
| 7,231,079 B2 | 6/2007 | Okuda et al. | |
| 7,257,247 B2 | 8/2007 | Bruce et al. | |
| 7,359,044 B2 * | 4/2008 | Nishiyama et al. | 356/237.4 |
| 2008/0112608 A1 * | 5/2008 | Yang et al. | 382/149 |

FOREIGN PATENT DOCUMENTS

| | | |
|---|---|---|
| JP | 2000-068342 | 3/2000 |
| JP | 2000-311924 | 11/2000 |
| JP | 2005-079491 | 3/2005 |

* cited by examiner

*Primary Examiner* — Michael A Lyons
(74) *Attorney, Agent, or Firm* — McDermott Will & Emery LLP

(57) ABSTRACT

A data processing unit acquires a review image including a pattern defect on a substrate, compares the review image with a reference image thereby to extract a defect image, the reference image including no pattern defect, and performs an alignment between the review image and a self-layer design pattern image which is generated from design data belonging to the identical layer in a region corresponding to the review image. The data processing unit, then, based on result of the alignment, generates an another-layer design pattern image which is generated from design data belonging to another layer in the region corresponding to the review image, and, based on a synthesized image of the defect image and the another-layer design pattern image, determines the relative position relationship between the pattern defect and a pattern belonging to another layer, and judges the criticality based on the relative position relationship.

9 Claims, 9 Drawing Sheets

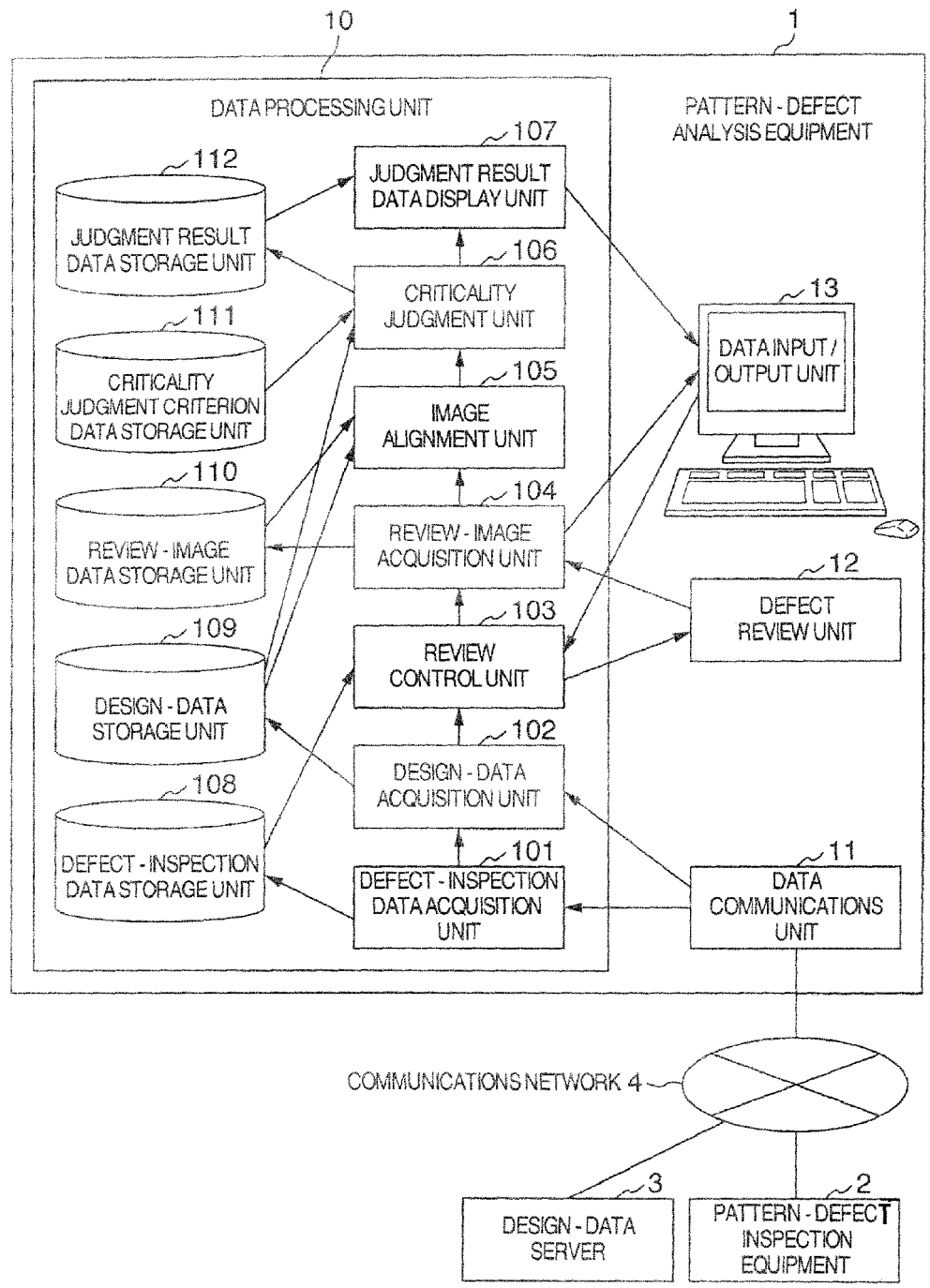

LAYER L3

LAYER L2

LAYER L1

SYNTHESIS OF DEFECT IMAGE AND SELF-LAYER DESIGN DATA

SYNTHESIS OF DEFECT IMAGE AND ANOTHER-LAYER DESIGN DATA

DEFECT - DETECTED LAYER + HIGHEST - CRITICALITY LAYER

DEFECT - DETECTED LAYER + ALL LAYERS CONCERNED

FOREIGN SUBSTANCE

WIRING CONVEX PORTION

WIRING CONCAVE PORTION

DISCONNECTION

WIRING SHORT-CIRCUIT

FIG.9

CRITICALITY JUDGMENT CRITERION DATA

| DEFECT TYPE | MEASUREMENT ITEM | LAYER OF DEFECT | LAYER OF DESIGN DATA | JUDGMENT THRESHOLD VALUE | SET CRITICALITY | | |
|---|---|---|---|---|---|---|---|
| | | | | | MEASUREMENT VALUE IS SMALLER THAN 0 | MEASUREMENT VALUE IS UNDER THRESHOLD VALUE | MEASUREMENT VALUE IS LARGER THAN THRESHOLD VALUE |
| FOREIGN SUBSTANCE | INTER-FOREIGN-SUBSTANCE-WIRING DISTANCE | L2 | L2 | 70 | 3 | 2 | 1 |
| FOREIGN SUBSTANCE | INTER-FOREIGN-SUBSTANCE-WIRING DISTANCE | L2 | L3 | 40 | 3 | 2 | 1 |
| ... | ... | ... | ... | ... | ... | ... | ... |
| WIRING CONVEX PORTION | DISTANCE WITH ADJACENT WIRING | L2 | L2 | 70 | 3 | 2 | 1 |
| WIRING CONVEX PORTION | DISTANCE WITH ADJACENT WIRING | L2 | L3 | 20 | 2 | 1 | 1 |
| ... | ... | ... | ... | ... | ... | ... | ... |
| WIRING CONCAVE PORTION | CONCAVE-PORTION WIRING WIDTH | L2 | L2 | 30 | 3 | 2 | 1 |
| ... | ... | ... | ... | ... | ... | ... | ... |

PATTERN DEFECT ANALYSIS EQUIPMENT, PATTERN DEFECT ANALYSIS METHOD AND PATTERN DEFECT ANALYSIS PROGRAM

BACKGROUND OF THE INVENTION

1. Field of the Invention

The present invention relates to a pattern-defect analysis equipment, pattern-defect analysis method, and pattern-defect analysis program for judging the criticality of a pattern defect occurring on the surface of a substrate such as an integrated-circuit board or LCD substrate on which a predetermined pattern is formed.

2. Description of the Related Art

In general, a pattern defect occurring on the surface of a substrate such as an integrated-circuit board is detected as a difference image between a defect-occurring image on the inspection-target-substrate surface acquired using an optical microscope or electron microscope, and a no-defect-occurring image on the inspection-target-substrate surface acquired in advance. The equipment for detecting pattern defects (which, hereinafter, will be referred to as defects simply) with a high efficiency based on a defect detection method as described above is generally called a pattern-defect inspection equipment (which, hereinafter, will be referred to as a defect inspection equipment simply). Here, these defects occur and exist on the substrate such as an integrated-circuit board which is in its fabrication process.

The defect inspection equipment is used in such a manner that this equipment is integrated into a production line for fabricating the substrate such as an integrated-circuit board. For this reason, its function and performance resource is basically dedicated to an enhancement in the throughput of the defect inspection. Accordingly, the defect inspection equipment is limited into the detection of information such as position coordinate of a defect and size of the defect. Consequently, a defect review equipment is further used in order to acquire detailed information about the defect such as type of the defect.

Based on the information such as position coordinate of a defect and size of the defect provided from the defect inspection equipment, the defect review equipment magnifies the image of the defect, then acquiring the detailed information about the defect from this magnified image of the defect. The defect review equipment possesses such functions as, e.g., the following one: The equipment evaluates such data as shape, luminance, and variation in brightness of the defect in accordance with a predetermined evaluation criterion. Then, based on this evaluation result acquired, the equipment identifies the type of the defect.

In the practically-available conventional defect review equipment, however, there is the following undesirable tendency: Namely, attention is paid to the analysis of the defect itself, but no attention is paid to the relative relationship between the defect and some other circuit component. This undesirable tendency has made it impossible to analyze the relative position relationship between the defect and the circuit component such as a wiring formed on the substrate, although identifying the type of the defect or the like remains intact and executable. As a consequence, it has been found impossible to judge information such as the impact which the defect will exert on functions of the integrated circuit or the like to be formed on the substrate.

Despite these impossibilities, however, at the document level, as disclosed in, e.g., JP-A-2000-311924 and JP-A-2000-68342, the criticality and impact of a defect exerted on a circuit component are judged by analyzing the relative position relationship between the defect and a pattern to be formed on the surface of the substrate. According to these documents, the criticality and impact of a defect exerted on a circuit component are judged by judging whether or not the defect is in contact with the circuit component, or by calculating the distance between the defect and the circuit component. Here, this judgment or calculation is made based on the data on the position coordinate and size of the defect acquired by the defect inspection equipment, and design data of the pattern to be formed on the surface of the substrate.

SUMMARY OF THE INVENTION

Nevertheless, in the methods disclosed in JP-A-2000-311924 and JP-A-2000-68342 of judging the criticality and impact of a pattern defect on the substrate surface exerted on a circuit component, there exist, e.g., the following problems:

First of all, the criticality and impact of the defect are the ones which are judged based on the data acquired from the defect inspection equipment, and are not the ones which are judged using the defect review equipment. Namely, the data on the position coordinate and size of the defect are not acquired by focusing attention on the defect on each defect basis to magnify the image of the defect, and acquiring the data from this magnified image. Also, the coordinate value of the defect is not necessarily the data which is acquired as a result of making an alignment with the design data. Accordingly, concerning the data on the position coordinate and size of the defect, there is the problem in the aspect of accuracy. In particular, when the criticality and impact of the defect are judged based on the distance between the defect and the circuit component, it is hard to say that the criticality and impact judged will exhibit a sufficient reliability.

Second, the criticality and impact of the defect are judged based on only the relative position relationship between the defect and a circuit component that exists in a layer which is identical to the layer where the defect is detected. In recent years, however, in a substrate such as an integrated-circuit board, an inter-layer insulating film has become thinner and thinner in accompaniment with microminiaturization of the circuit component. For example, there has been an ever increasing tendency that such a defect as a foreign substance which occurred in a certain layer will exert an influence on an upper layer and a lower layer for this layer. Namely, when a defect is detected in a certain layer, and even if the defect exists at a position where the defect will exert no influence on whatever circuit component existing in the layer and vise versa, if a circuit component existing in the upper layer or the lower layer exists directly above or directly below the defect, the circuit component in the upper layer or the lower layer is certain to undergo the influence from the defect without fail. Still further, there is even a possibility that, depending on the cases, the circuit component may undergo a critical influence from the defect. Consequently, it can be said that, in the case of determining the criticality and impact of a defect, a reliable result cannot be obtained unless consideration is also given to the relative position relationship between the defect and circuit components existing in an upper layer and a lower layer for this layer.

In this way, in the methods disclosed in JP-A-2000-311924 and JP-A-2000-68342, there exists the problem that the criticality and impact of a pattern defect on the substrate surface can not necessarily be determined with a high accuracy and with a high reliability.

In view of the problems in the conventional technologies as described above, an object of the present invention is to provide a pattern-defect analysis equipment, pattern-defect analysis method, and pattern-defect analysis program for making it possible to determine, with a high accuracy, the relative position relationship between a defect on the surface of the substrate and a circuit component that exists in a layer which is different from a layer in which the defect is detected, and further, for making it possible to determine the criticality of the defect with an even higher reliability.

In order to accomplish the above-described object, in the present invention, it is made possible to determine the relative position relationship between a defect on the surface of the substrate and a circuit component that exists in a layer which is different from a layer in which the defect is detected.

Namely, the pattern-defect analysis equipment of the present invention includes a surface-observation-image acquisition unit for acquiring a surface observation image of a partial region on surface of a substrate on which patterns of a plurality of layers are formed, and a data processing unit for storing design data about configurations of the patterns formed in each layer of the substrate, and judging criticality of a pattern defect included in the surface observation image of the partial region of the substrate acquired by the surface-observation-image acquisition unit, wherein the data processing unit acquires, via the surface-observation-image acquisition unit, a surface observation image of the partial region in a layer that includes the pattern defect, the partial region including the pattern defect, compares the acquired surface observation image with a predetermined reference image, and thereby extracts an image of the pattern-defect portion as a defect image from the surface observation image, the predetermined reference image including no pattern defect, performs an alignment between a self-layer design pattern image and the surface observation image by performing an image matching between the self-layer design pattern image and the surface observation image, the self-layer design pattern image being generated from the design data, the design data belonging to a layer which is identical to the layer that includes the pattern defect with respect to the partial region corresponding to the surface observation image, generates a first synthesized image based on result of the alignment, the first synthesized image being generated by synthesizing the defect image with an another-layer design pattern image, the another-layer design pattern image being generated from the design data, the design data belonging to a layer which is different from the layer that includes the pattern defect with respect to the partial region corresponding to the surface observation image, determines data based on the first synthesized image, the data indicating a first relative position relationship between the pattern defect and a pattern, the pattern belonging to the layer which is different from the layer that includes the pattern defect, and judges the criticality based on the determined data indicating the first relative position relationship, the pattern defect exerting the criticality on the pattern, the pattern belonging to the layer which is different from the layer that includes the pattern defect.

According to the present invention, it becomes possible to provide the pattern-defect analysis equipment, pattern-defect analysis method, and pattern-defect analysis program for making it possible to determine, with a high accuracy, the relative position relationship between a defect on the surface of the substrate and a circuit component that exists in a layer which is different from a layer in which the defect is detected, and further, for making it possible to determine the criticality of the defect with an even higher reliability.

Other objects, features and advantages of the invention will become apparent from the following description of the embodiments of the invention taken in conjunction with the accompanying drawings.

BRIEF DESCRIPTION OF THE DRAWINGS

FIG. 1 is a diagram for illustrating an example of the configuration of a pattern-defect analysis equipment according to an embodiment of the present invention, and an example of the entire configuration of a system to which the pattern-defect analysis equipment is applied;

FIG. 9 is a diagram for illustrating an example of the configuration of the criticality judgment criterion data in the pattern-defect analysis equipment according to the embodiment of the present invention.

DESCRIPTION OF THE INVENTION

Figure 2A:
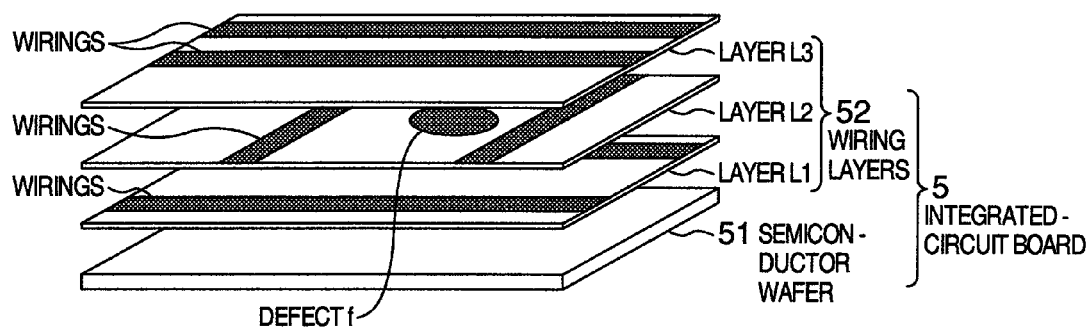
FIG. 2A to FIG. 2D are diagrams for illustrating an example of the configuration of an integrated-circuit board which becomes the target of the pattern-defect analysis in the embodiment of the present invention.

Hereinafter, referring to the drawings as required, the detailed explanation will be given below concerning embodiments of the present invention.

FIG. 1 is a diagram for illustrating an example of the configuration of a pattern-defect analysis equipment according to an embodiment of the present invention, and an example of the entire configuration of a system to which the pattern-defect analysis equipment is applied. As illustrated in FIG. 1, the pattern-defect analysis equipment 1 includes configuration units such as a data processing unit 10, a data communications unit 11, a defect review unit 12, and a data input/output unit 13. The pattern-defect analysis equipment 1 is connected to a pattern-defect inspection equipment 2 and a design-data server 3 via a communications network 4.

Here, the pattern-defect inspection equipment 2 is configured including a microscope such as a scanning electron microscope or optical microscope. The equipment 2 acquires the surface observation image of a pattern formed on the surface of a substrate, then detecting pattern defects resulting therefrom or foreign substances (which, hereinafter, will be simply referred to as defects as the general term). Then, the equipment 2 outputs data on the position coordinate and size of each of the defects detected. Also, the design-data server 3, which is configured with a computer including a large-capacity storage device such as hard disc device, accumulates and manages design data indicating configuration of the pattern formed on the substrate, i.e., the analysis target. Also, the communications network 4 is configured with LAN (Local Area Network), WAN (Wide Area Network), or the Internet.

The pattern-defect analysis equipment 1 is equivalent to the equipment which is generally referred to as the defect review equipment. Moreover, the defect review unit 12 of the pattern-defect analysis equipment 1 is configured including a microscope such as a scanning electron microscope or optical microscope. The defect review unit 12 acquires the surface observation image of the pattern formed on the surface of the analysis-target substrate. Also, the data processing unit 10 is configured including at least a not-Illustrated CPU (: Central processing Unit) and a not-Illustrated storage device including a semiconductor memory or hard disc device. The pattern-defect analysis equipment 1 possesses a function similar to the ordinary defect review equipment, such as processing the surface observation image of the pattern on the analysis-target substrate acquired by the defect review unit 12, and detecting and classifying the defects. In addition to this function, the pattern-defect analysis equipment 1 also possesses functions unique to the present embodiment, which, hereinafter, will be explained sequentially.

Furthermore, the data communications unit 11, which is configured with a network interface card or router, connects the data processing unit 10 to the communications network 4. Also, the data input/output unit 13 is configured with configuration components such as keyboard, mouse, pen tablet, and LCD (: Liquid Crystal Display) display device. The data input/output unit 13 is used for user's inputting various information for allowing the data processing unit 10 to operate the defect review unit 12 and the like. The data input/output unit 13 is also used for displaying the surface observation image of the pattern on the substrate acquired by the defect review unit 12, and various data processed by the data processing unit 10.

Incidentally, in the present embodiment, for simplicity of the explanation, the analysis-target substrate for the pattern-defect analysis equipment 1 is assumed to be an integrated-circuit board which is in the course of forming an integrated circuit on a semiconductor wafer. The analysis-target substrate, however, is not limited thereto. Namely, the analysis-target substrate is also allowed to be a LCD substrate or organic EL (: Electroluminescence) display substrate which is in the course of its fabrication.

Subsequently, the detailed explanation will be given below concerning the configuration of the data processing unit 10.

As illustrated in FIG. 1, the data processing unit 10 includes a processing function block of units such as a defect-inspection data acquisition unit 101, a design-data acquisition unit 102, a review control unit 103, a review-image acquisition unit 104, an image alignment unit 105, a criticality judgment unit 106, and a judgment result data display unit 107, and a storage function block of units such as a defect-inspection data storage unit 108, a design-data storage unit 109, a review-image data storage unit 110, a criticality judgment criterion data storage unit 111, and a judgment result data storage unit 112.

Here, functions of the processing function block of the units such as the defect-inspection data acquisition unit 101, the design-data acquisition unit 102, the review control unit 103, the review-image acquisition unit 104, the image alignment unit 105, the criticality judgment unit 106, and the judgment result data display unit 107 are implemented in such a manner that the not-Illustrated CPU of the data processing unit 10 executes predetermined programs stored in the similarly-not-Illustrated storage device. Also, the storage function block of the units such as the defect-inspection data storage unit 108, the design-data storage unit 109, the review-image data storage unit 110, the criticality judgment criterion data storage unit 111, and the judgment result data storage unit 112 are configured on the not-Illustrated storage device.

In FIG. 1, the defect-inspection data acquisition unit 101 acquires the data on the pattern-defect inspection result of the analysis-target substrate acquired by the pattern-defect inspection equipment 2 as the result of the inspection. This acquisition is implemented from the pattern-defect inspection equipment 2 via the communications network 4 and the data communications unit 11. Moreover, the unit 101 stores the acquired data on the pattern-defect inspection result into the defect-inspection data storage unit 108 as the defect-inspection data. Here, the defect-inspection data is assumed to include the data indicating the position coordinate and size of each of the defects detected.

The design-data acquisition unit 102 acquires the design data on the analysis-target substrate accumulated by the design-data server 3. This acquisition is implemented from the design-data server 3 via the communications network 4 and the data communications unit 11. Moreover, the unit 102 stores the acquired design data into the design-data storage unit 109. Incidentally, what is referred to as the design data here refers to the data on the mask pattern for forming a circuit component or the like on the surface of the substrate. Namely, the design data is assumed to be the data capable of indicating at least the configuration of the pattern such as the circuit component or the like, which is to be formed on the surface of the substrate by the data.

Also, when acquiring the design data on the analysis-target substrate, the design-data acquisition unit 102 is allowed not to acquire all of the design data, but to acquire part of the design data by excerpting it. For example, if the position of a defect of the analysis target is limited, or if a layer in which the defect exists is limited, the design-data acquisition unit 102 transmits, to the design-data server 3, data for specifying a region or the layer of the analysis target. In this way, the unit 102 instructs the design-data server 3 to excerpt the part of the design data. Having received this instruction, the design-data server 3 excerpts the design data instructed, then transmitting the excerpted design data to the pattern-defect analysis equipment 1. In this case, the data amount to be transmitted from the design-data server 3 to the pattern-defect analysis equipment 1 is reduced. This reduction reduces a communications load imposed on the communications network 4, and simultaneously, shortens a transmission time needed for the design data. Accordingly, the total time needed for the pattern-defect analysis is also shortened.

With respect to the defect review unit 12 (i.e., scanning electron microscope or the like), the review control unit 103 sets data for operating the defect review unit 12, i.e., data such as position data, magnification, and contrast of the region containing the defect of the analysis target. In this way, the review control unit 103 instructs the defect review unit 12 to photograph the surface of the analysis-target substrate. In this case, this set data may also be stored into the storage device in advance as defect-analyzing recipe data. Otherwise, depending on the requirements, the person in charge of the defect analysis may input this set data via the data input/output unit 13. Incidentally, the position data on the defect is set by selecting a piece of position coordinate data out of the position coordinate data included in the defect-inspection data stored into the defect-inspection data storage unit 108.

The review-image acquisition unit 104 acquires the surface observation image of the surface of the analysis-target substrate photographed by the defect review unit 12 in accordance with the instruction from the review control unit 103. Furthermore, the unit 104 stores the acquired surface observation image of the surface of the analysis-target substrate into the review-image data storage unit 110, and simultaneously, displays the acquired image on the display device of the data input/output unit 13. Incidentally, in the present specification, the surface observation image of the surface of the analysis-target substrate acquired by the review-image acquisition unit 104, hereinafter, will be referred to as the review image simply.

First, the image alignment unit 105 compares the review image acquired by the review-image acquisition unit 104 with a reference image, thereby detecting a difference image therebetween as a defect image. Here, the reference image refers to the review image of a region that has the same pattern configuration as the region in which the review image of the analysis-target substrate has been acquired, and that has been known as including no defect therein, or the pattern image generated from the design data corresponding to this region.

Also, the image alignment unit 105 performs an alignment between the review image acquired by the review-image acquisition unit 104 and a self-layer design pattern image by performing an image matching between the review image and this self-layer design pattern image. Here, this self-layer design pattern image is generated from the design data belonging to a layer which is the same as the layer of the same region portion as the review image. In this way, the image alignment unit 105 implements commonality of the coordinate systems between the review image and the design data. Moreover, the unit 105 generates a self-layer defect synthesized image (which is equivalent to a second synthesized image described in the appended claims or the like) that is obtained by synthesizing the self-layer design pattern image with the defect image.

Furthermore, the image alignment unit 105 generates an another-layer design pattern image. This generation is performed based on the design data belonging to a layer which is different from the layer of the same region portion as the review image acquired by the review-image acquisition unit 104. In addition, the unit 105 generates an another-layer defect synthesized image (which is equivalent to a first synthesized image described in the appended claims or the like) that is obtained by synthesizing the another-layer design pattern image with the defect image.

The criticality judgment unit 106 acquires data indicating the relative position relationship between a defect detected using the review image and a pattern belonging to the layer which is the same as the layer of the defect (which is, e.g., the separation distance between the defect and the pattern, and is equivalent to a second relative position relationship described in the appended claims or the like), and data indicating the relative position relationship between a defect detected using the review image and a pattern belonging to the layer which is different from the layer of the defect (which is, e.g., the separation distance between the defect and the pattern, and is equivalent to a first relative position relationship described in the appended claims or the like). These acquisitions are performed based on the self-layer defect synthesized image and the another-layer defect synthesized image generated by the image alignment unit 105.

The criticality judgment unit 106 judges the criticality of the defect. This judgment is made based on the acquired data indicating the first or second relative position relationships, and criticality judgment criterion data stored in the criticality judgment criterion data storage unit 111. Moreover, the unit 106 stores the data on the judged criticality into the judgment result data storage unit 112. Incidentally, regarding an example of the data configuration of the criticality judgment criterion data storage unit 111, the detailed explanation will be given separately, referring to a drawing associated therewith.

The judgment result data display unit 107 displays the data on the information, such as the criticality of the defect judged by the criticality judgment unit 106 and the position coordinate and size of the defect, on the display device of the data input/output unit 13 in a manner of the list or the like. Regarding an example of this display, the detailed explanation will be given separately, referring to a drawing associated therewith.

Subsequently, introducing concrete examples, the explanation will be given below concerning processing steps of the pattern-defect analysis to be made using the pattern-defect analysis equipment 1. FIG. 2A to FIG. 2D are diagrams for illustrating an example of the configuration of an integrated-circuit board which becomes the target of the pattern-defect analysis in the present embodiment.

As illustrated in FIG. 2A, an integrated-circuit board 5 is configured as follows: On a semiconductor wafer 51 which is composed of substance such as silicon monocrystal, and on which a large number of not-illustrated active elements are formed, wiring layers 52 including a plurality of layers for connecting the active elements are formed. Incidentally, in many cases, the semiconductor wafer generally refers to the entire board before an integrated circuit or the like has been formed thereon, when it is in the course of being formed thereon, or after it has been formed thereon. It is assumed for convenience here, however, that the semiconductor wafer refers to a board becoming its base, e.g., the wafer which is composed of substance such as silicon monocrystal, or the wafer on which the active elements such as transistors are formed.

In the example in FIG. 2A, the wiring layers 52 including three layers of layer L1, layer L2, and layer L3 are illustrated. The layer number of the wiring layers 52, however, is not limited to the three layers. Also, the respective wiring layers 52 are formed of an electrically-conductive metal such as, e.g., aluminum or copper. An insulating film composed of substance such as silicon oxide or silicon nitride is formed between the respective wiring layers 52, and between the wiring layers 52 and the active elements. Incidentally, when connecting the wirings of the different wiring layers 52 to each other, or when connecting the wirings of the wiring layers 52 to the active elements formed on the semiconductor wafer 51, a not-illustrated contact hole is formed in the insulating films, then filling the contact hole with substance such as an electrically-conductive metal.

When fabricating the integrated-circuit board 5 as described above, first, an active region is formed using a method such as injecting an impurity into the semiconductor wafer 51. Moreover, layers such as gate layers are formed, thereby forming the active elements. Furthermore, the active elements are covered with an insulating film, then forming the wirings of the layer L1 thereon. Subsequently, the wirings of the layer L1 are covered with another insulating film, then forming the wirings of the layer L2 thereon. In addition, the wirings of the layer L2 are covered with still another insulating film, then forming the wirings of the layer L3 thereon.

In the fabrication steps of the integrated-circuit board 5 like this, in order to make fabrication-steps management, every time the wiring formation step for each layer is over, the pattern-defect inspection on the wiring pattern formed at the step is carried out using the pattern-defect inspection equipment 2. Moreover, if some problem on the fabrication step is found out as a result of the pattern-defect inspection, or if some problem is judged to be necessary for the fabrication-step management as a result of the pattern-defect inspection, the detailed defect analysis is further carried out using the pattern-defect analysis equipment 1 with respect to a defect detected by the pattern-defect inspection equipment 2.

In FIG. 2A, the example is illustrated where a defect f (e.g., foreign substance) is detected as a result of the pattern-defect inspection after the formation of the wirings of the layer L2. In this case, when the surface observation image of the integrated-circuit board 5 at this time is acquired using the pattern-defect analysis equipment 1, a wiring image of the layer L2 as is illustrated in, e.g., FIG. 2C is acquired. In the example illustrated in FIG. 2C, the defect f exists in a portion where the wirings are not formed. On account of this situation, it is conceivable that the defect f will exert no significant influence on operation of the integrated circuit.

Figure 2B:
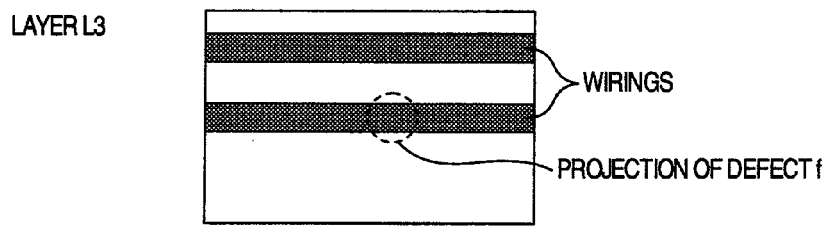
Figure 2C:
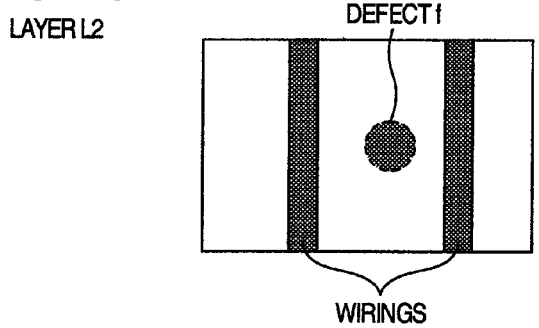

As illustrated in FIG. 2B, however, there is a case where the wiring of the layer L3 happens to be formed directly above the defect f (i.e., projection portion of the defect f). In this case, it is possible that, if the defect f is a hard foreign substance, the defect f might disconnect the wiring of the layer L3. Namely, it turns out that the defect f which is detected by the pattern-defect inspection in the layer L2 will exert its influence on the wiring existing in the other layer L3, and as a result, the defect f will exert some bad influence on the operation of the integrated circuit.

Figure 2D:
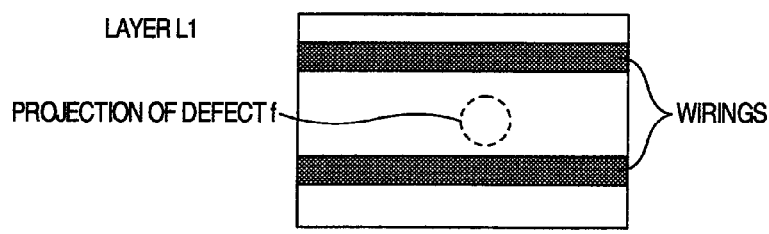

Basically the same circumstances can apply for the wirings of the layer L1 that is below the layer L2 which includes the defect f. In this example, as illustrated in FIG. 2D, although the wirings of the layer L1 are not formed directly below the defect f (i.e., projection portion of the defect f), if the wiring of the layer L1 happens to be formed directly below the defect f, this wiring will undergo some influence from the defect f. In this case, it is possible that the defect f might disconnect the wiring depending on the cases. Also, even when the projection portion of the defect f is not in contact with the wiring that is directly below the projection portion, it is possible that, if the distance therebetween is small or depending on the type of the wiring, an increase in the stray capacity or the like might give rise to a deterioration in the performance of the integrated circuit.

As having been explained so far, consideration is given to the possibility that a defect which is detected by the pattern-defect inspection in a certain layer will also exert its influence on a circuit component such as a wiring which is positioned in another layer. Based on this viewpoint, in the defect-analysis processing steps of the present embodiment which will be described hereinafter, when a defect is detected in a certain layer, the relative position relationship between the defect and a circuit component will be checked not only for the self layer but also for another layer.

Figure 3:
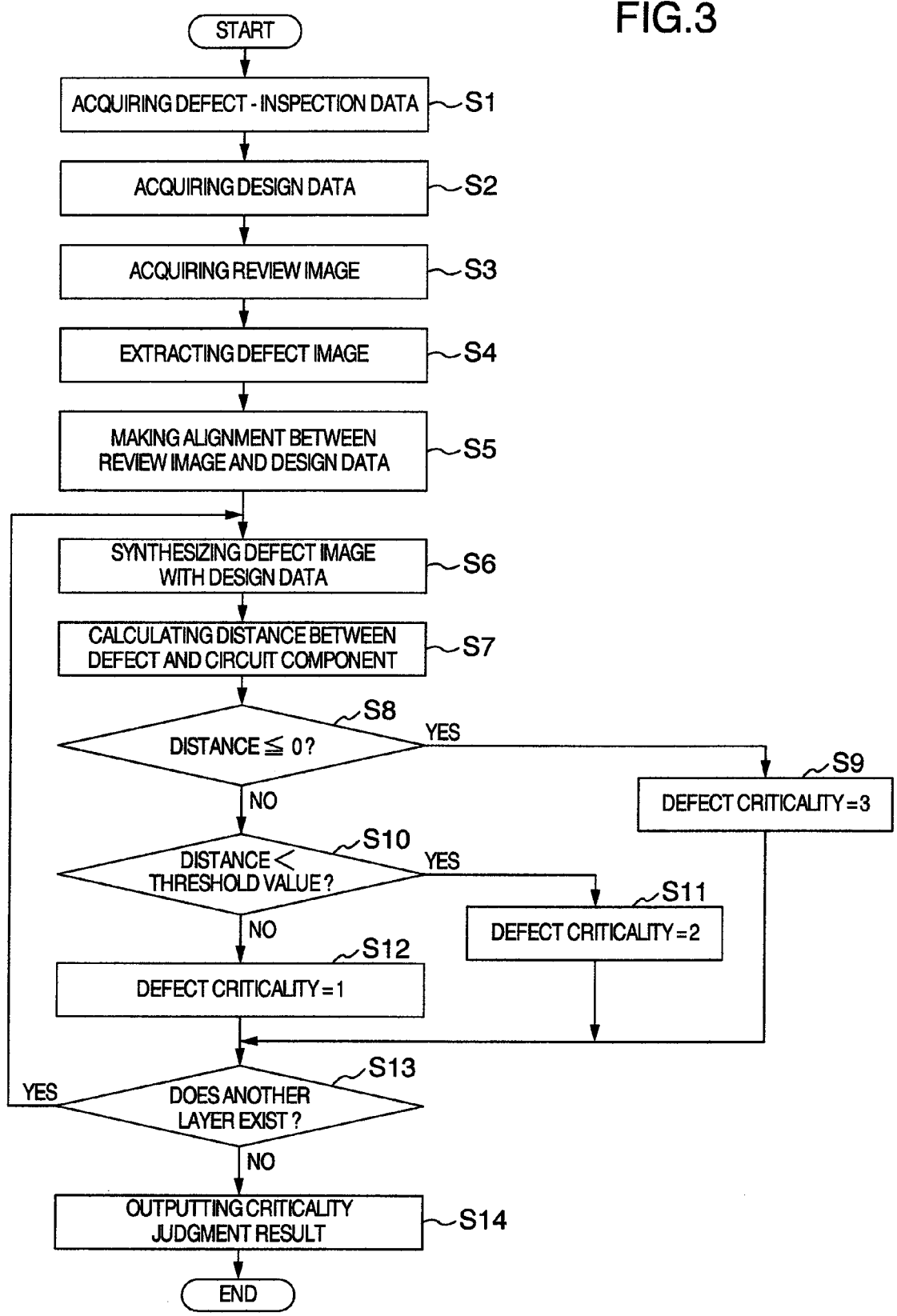
FIG. 3 is a diagram for illustrating processing steps of the pattern-defect analysis by the pattern-defect analysis equipment according to the embodiment of the present invention.

FIG. 3 is a diagram for illustrating the processing steps of the pattern-defect analysis made by the pattern-defect analysis equipment 1. When making the pattern-defect analysis, first, an analysis-target substrate is installed on a (not-illustrated) sample stage of the defect review unit 12. Moreover, as illustrated in FIG. 3, the data processing unit 10 of the pattern-defect analysis equipment 1 acquires the defect-inspection data on the analysis-target substrate from the pattern-defect inspection equipment 2 (step S1). Furthermore, the unit 10 stores the acquired defect-inspection data into the defect-inspection data storage unit 108. In addition, the data processing unit 10 acquires the design data on the analysis-target substrate from the design-data server 3 (step S2), then storing the acquired design data into the design-data storage unit 109. Incidentally, the design data acquired at this time is allowed not to be all of the design data on the analysis-target substrate, but to be the excerpted design data thereon.

Next, the data processing unit 10 extracts a piece of defect-inspection data on the substrate from the defect-inspection data storage unit 108. Then, based on the position coordinate of a defect included in this defect-inspection data, the unit 10 acquires the review image of the substrate surface which includes this defect into its field-of-view (step S3).

Next, the data processing unit 10 compares the acquired review image with a reference image of the portion corresponding to this review image, thereby extracting a defect image (step S4). Here, the defect image indicates the region of the defect on the review image. Moreover, the data processing unit 10 performs an alignment between the review image and the design data (in the present specification, hereinafter, the pattern image generated from the design data will also be referred to as the design data simply) (step S5). In this way, the unit 10 allows the defect image, i.e., the position and size of the defect, to be represented using the coordinate system of the design data. Incidentally, regarding the extraction of the defect image and the alignment between the review image and the design data, the detailed explanation will be given separately, referring to FIG. 4 and FIG. 5A and FIG. 5B respectively.

Next, the data processing unit 10 synthesizes the review image with the design data (step S6), then calculating the distance between the defect and a circuit component (i.e., pattern such as a wiring) (step S7). Furthermore, if the calculated distance between the defect and the circuit component is found to be smaller than "0", i.e., the defect is in contact with the circuit component, or the defect and the circuit component are overlapped with each other (: Yes at a step S8), the unit 10 judges the defect criticality as being "3" (step S9). Also, if the distance between the defect and the circuit component is found to be larger than "0" (: No at the step S8), and if the distance between the defect and the circuit component is found to be smaller than a predetermined threshold value (: Yes at a step S10), the unit 10 judges the defect criticality as being "2" (step S11). Also, if the distance between the defect and the circuit component is found to be larger than the predetermined threshold value (: No at the step S10), the unit 10 judges the defect criticality as being "1" (step S12). Incidentally, the threshold value in the judgment at the step S10 is data which configures part of the criticality judgment criterion data. This criticality judgment criterion data is assumed to be stored into the criticality judgment criterion data storage unit 111 in advance. Additionally, the configuration of the criticality judgment criterion data will be described later.

Here, the defect criticality is a numerical value for indicating an extent to which the defect will exert its influence on the circuit component. The defect criticality "3" means that the defect is a one which will be able to exert a critical influence on the function of the circuit component. The defect criticality "2" means that the defect is a one which will be able to exert a significant influence on the function of the circuit component. The defect criticality 1" means that the defect is a one which is expected not to exert the significant influence on the function of the circuit component. Additionally, here, although the defect criticality is classified into the three stages, the defect criticality need not necessarily be limited thereto.

The data processing unit 10 judges the defect criticality as described above, i.e., based on the relative position relationship between the defect and the circuit component of the design data belonging to a layer which is the same as the layer in which the defect is detected. After that, the data processing unit 10 makes reference to the criticality judgment criterion data storage unit 111, thereby judging whether or not there exists another layer on which the defect of the same layer will be able to exert its influence (step S13). Then, if there exists another layer of this kind (: Yes at a step S13), the data processing unit 10 executes the processings from the step 6 to the step 13 once again with respect to the design data belonging to another layer of this kind. Also, if it is found that there exists none of the layers on which the defect of the same layer will be able to exert its influence (: No at the step S13), the data processing unit 10 outputs, to the data input/output unit 13, the criticality judgment result judged up to this time (step S14). Additionally, a displayed example of the criticality judgment result into the data input/output unit 13 will be described later.

Figure 4:
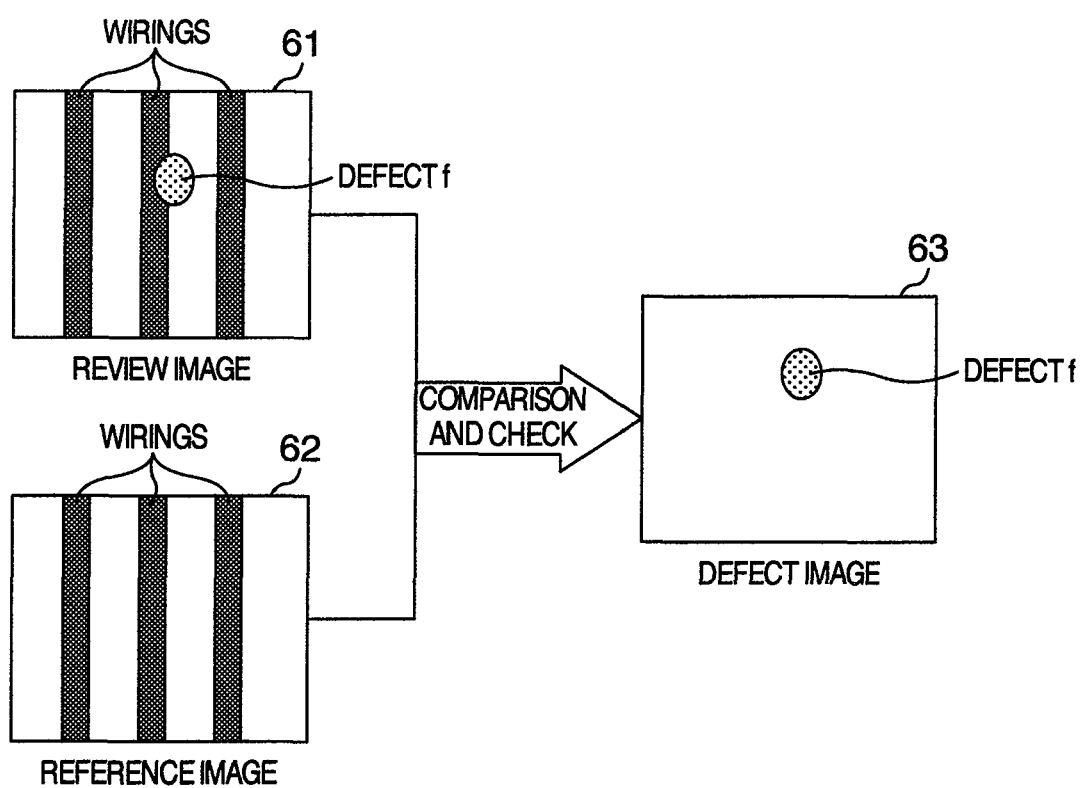
FIG. 4 is a diagram for schematically illustrating an example of the extraction of the defect image at the step S4 in FIG. 3.

FIG. 4 is a diagram for schematically illustrating an example of the extraction of the defect image at the step S4 in FIG. 3. The data processing unit 10 compares and checks the review image 61 of the surface of the analysis-target substrate with the reference image 62 corresponding to this review image, thereby extracting the difference image therebetween as the defect image 63 of the defect f.

Here, the reference image 62 is usually acquired from another portion of the same analysis-target substrate. When the analysis-target substrate is, e.g., an integrated-circuit board, a large number of identical integrated-circuit chips are formed on the same board. Accordingly, a region, which is the same region as the review image 61 and which includes no defect, is selected out of these identical integrated-circuit chips. Then, the review image in this selected region is defined and employed as the reference image 62. Also, if the integrated circuit to be formed on integrated-circuit board is such an integrated circuit as memory integrated circuit having a periodic cell structure, a large number of memory circuit cells of the same structure are formed on the same integrated-circuit chip. Consequently, the review image of a no-defect-including memory cell corresponding to the review image 61 of the defect-including memory cell is defined and employed as the reference image 62.

Also, as described earlier, the design data corresponding to the same position as that of the review image 61 is available as the reference image 62. In this case, however, the magnification degrees and coordinate positions of the images of both the design data and the review image need to be coincided with each other. Accordingly, the detection of its defect region will be performed in accompaniment with the processing of the alignment between the review image and the design data which will be explained next.

Incidentally, in the extraction processing of the defect image, a noise remains in the difference image due to a variation in the pattern formation at the time of the substrate formation. It is assumed, however, that this noise is eliminated by a filtering as required.

Figure 5A:
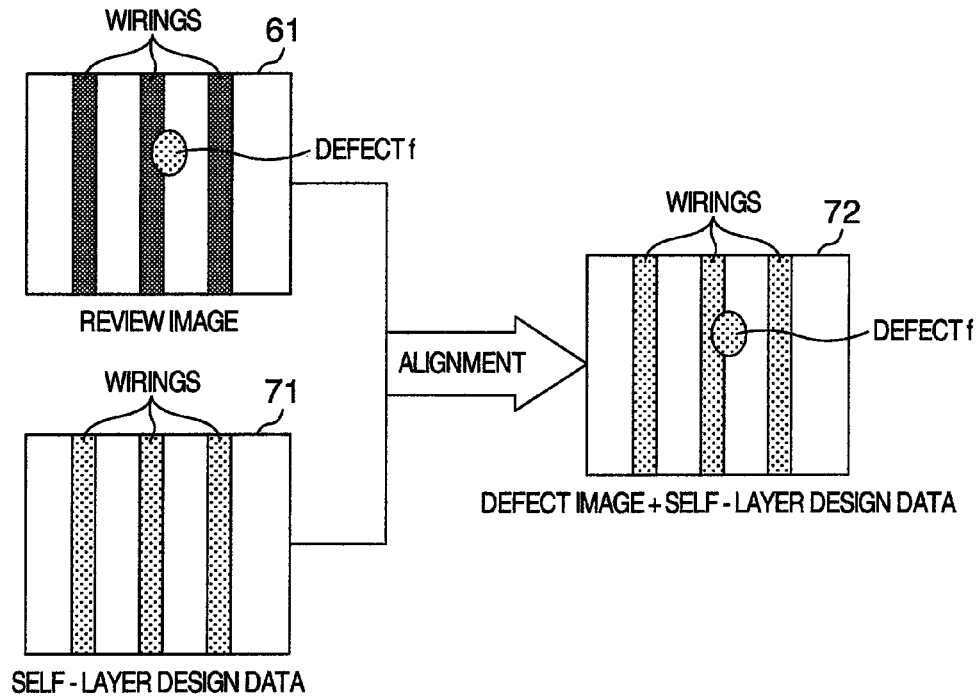
FIG. 5A and FIG. 5B are diagrams for schematically illustrating an example of the alignment between the review image and the design data at the step S5 in FIG. 3.
Figure 5B:
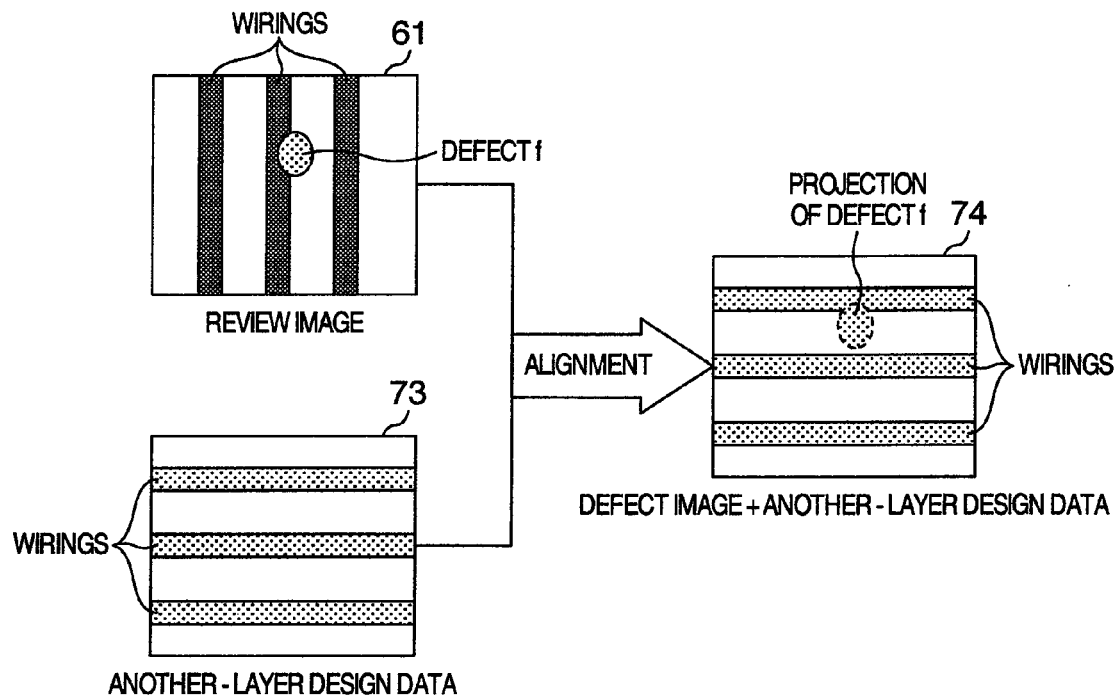

FIG. 5A and FIG. 5B are diagrams for schematically illustrating an example of the alignment between the review image and the design data at the step S5 in FIG. 3. As illustrated in FIG. 5A, the alignment between the review image 61 including the defect f and the design data 71 is performed using the design data belonging to a layer (which, hereinafter, will be referred to as the self layer) that is the same as the layer including the defect f. In this case, the data processing unit 10 performs the matching so that the difference amount between the images of both the review image and the design data becomes its minimum. In this way, the data processing unit 10 causes the magnification degrees and coordinate positions of both images to be aligned with each other, thereby generating the (second) synthesized image 72 that results from synthesizing the defect image of the defect f with the self-layer design data 71. Based on the (second) synthesized image 72, the data processing unit 10 determines the data indicating the (second) relative position relationship between the defect f and the circuit component such as a wiring belonging to the self layer (which is, e.g., the separation distance between the defect f and the wiring or the like), thereby judging the criticality of the defect f.

On the other hand, the alignment between the review image 61 including the defect f and the another-layer design data 73 need not be performed specifically. This is because the self-layer design data 71 and the another-layer design data 73 have been represented using the coordinate values of the same coordinate system. As illustrated in FIG. 5B, the data processing unit 10 has only to generate the (first) synthesized image 74 by merely embedding the defect image of the defect f into the another-layer design data 73 with the use of the already-aligned position coordinate and size of the defect f. Based on the (first) synthesized image 74, the data processing unit 10 determines the data indicating the (first) relative position relationship between the defect f and the circuit component such as a wiring belonging to another layer (which is, e.g., the separation distance between the defect f and the wiring or the like), thereby judging the criticality of the defect f.

Figure 6:
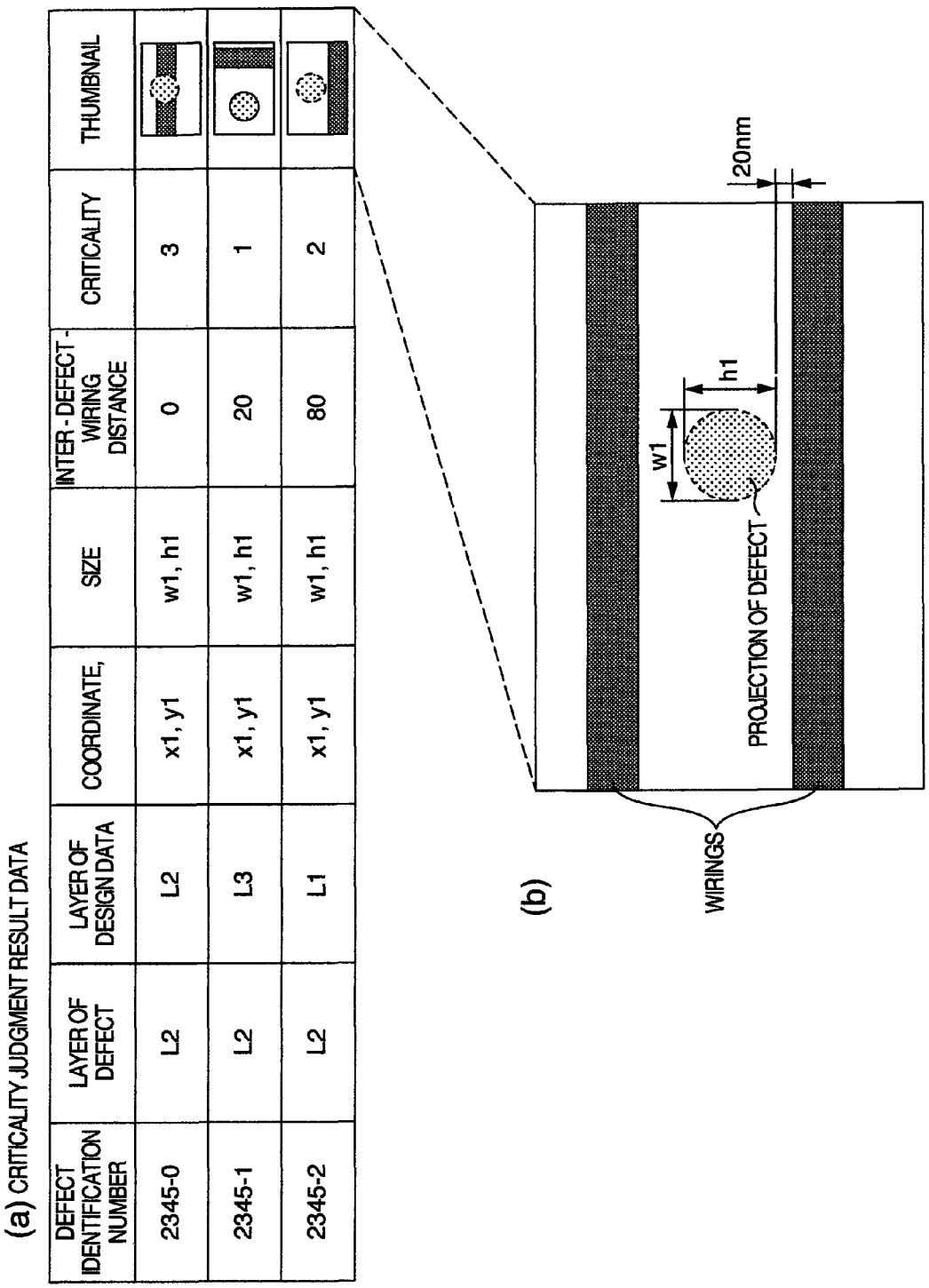
FIG. 6 is diagram for illustrating an example where the criticality judgment result at the step S14 in FIG. 3 is displayed on the display device.

FIG. 6 is diagram for illustrating an example where the criticality judgment result is displayed on the display device. At the step S14 in FIG. 3, the data processing unit 10 displays the criticality judgment result data, which is as illustrated in FIG. 6(a), on the display device of the data input/output unit 13. The criticality judgment result data includes data such as each defect identification number, layer of each defect (i.e., layer in which each defect is detected), layer of design data on a circuit component which becomes the target when relative position relationship between each defect and the circuit component is determined, coordinate of central position of each defect, size of each defect, distance between each defect and the circuit component such as a wiring, judged criticality, and thumbnail of image which includes each defect.

Here, the coordinate of central position of each defect is represented by the coordinate value (x1, y1) of the coordinate system of the design data, and the size of each defect is represented by its transverse width (w1) and height (h1). Also, the thumbnail is an image obtained by performing scale-reduction display of the synthesized image of the defect image with the design data. Moreover, e.g., if the thumbnail is clicked on, enlarged image of the synthesized image is supposed to be displayed as illustrated in FIG. 6(b). Furthermore, the values such as the size (w1, h1) of each defect and the distance between each defect and the circuit component may also be displayed on this enlarged image. Also, if the layer of each defect and the layer of the design data differ from each other, the display may be implemented in a manner of clearly showing that the defect image is projection of the defect. In this connection, in FIG. 6(b), profile of the defect region is represented using the dashed line in order to indicate that the defect image is the projection of the defect.

Figure 7A:
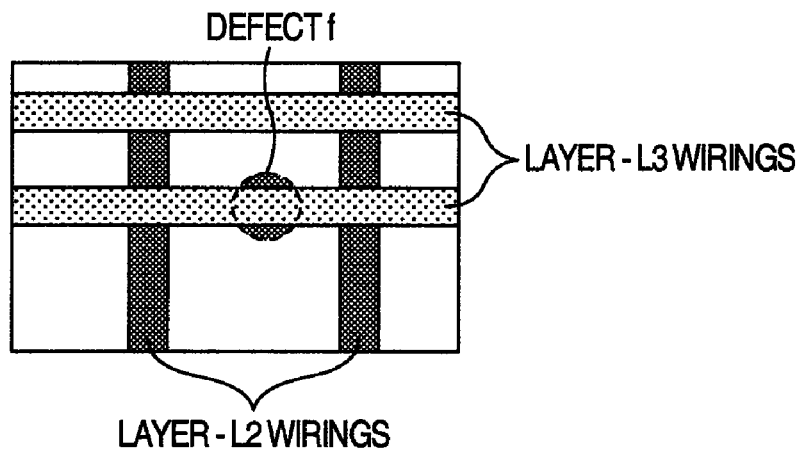
FIG. 7A and FIG. 7B are diagrams for illustrating an example where the relative position relationship between the pattern defect and circuit components of a plurality of layers is displayed on the display device in the pattern-defect analysis equipment according to the embodiment of the present invention.
Figure 7B:
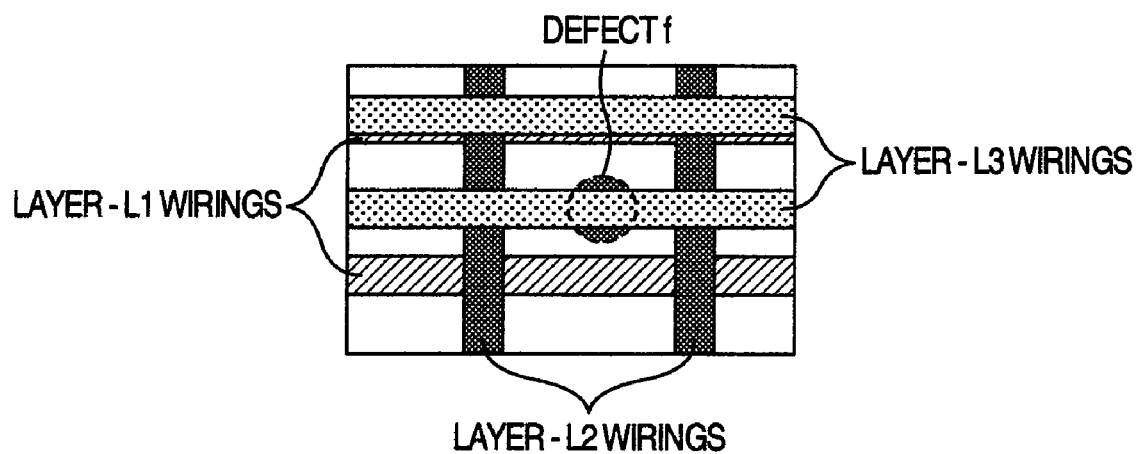

FIG. 7A and FIG. 7B are diagrams for illustrating examples where the relative position relationships between the defect and the circuit components (i.e., wirings) of the plurality of layers are displayed on the display device. At the step S14 in FIG. 3, the data processing unit 10 has displayed the criticality judgment result as is illustrated in FIG. 6(a). Not only this display of the criticality judgment result, as is illustrated in FIG. 7A, the data processing unit 10 also displays the circuit components (i.e., layer-L2 wirings) of the defect-detected layer (i.e., layer L2 in this case) including the defect, and the circuit components (i.e., layer-L3 wirings) of the highest-criticality layer (i.e., layer L3 in this case) in a manner of being superimposed on each other. Also, as is illustrated in FIG. 7B, the data processing unit 10 is also allowed to display the circuit components (i.e., layer-L2 wirings) of the defect-detected layer including the defect, and the circuit components (i.e., layer-L1 wirings, layer-L2 wirings, and layer-L3 wirings) of all the other layers concerned in the manner of being superimposed on each other. The implementation of the display like this allows the user of the pattern-defect analysis equipment 1 to easily grasp the relative position relationship between the defect and the self-layer or another-layer circuit components.

FIG. 8A to FIG. 8E are diagrams for illustrating examples of defect types which become the targets of the pattern-defect analysis using the pattern-defect analysis equipment 1.

Figure 8A:
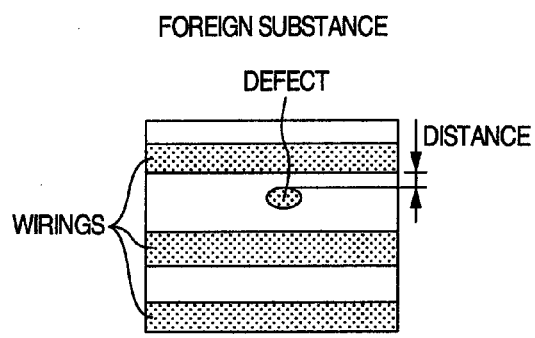
FIG. 8A to FIG. 8E are diagrams for illustrating examples of defect types which become the targets of the pattern-defect analysis using the pattern-defect analysis equipment according to the embodiment of the present invention.

FIG. 8A is an example in the case where the defect is also a foreign substance. In this example, although the foreign substance exists among a plurality of wirings, it may also exist on the wiring. A foreign substance is usually composed of a material which is different from the material of which a circuit component such as a wiring is composed. As a result, even if the defect exists on the wiring, the boundary therebetween is identifiable in many cases. With respect to the defect of a foreign substance like this, as was explained in FIG. 2A to FIG. 6(b), the distance between the defect and the circuit component such as the wiring is measured, then judging the criticality of the defect by using this measurement value.

Figure 8B:
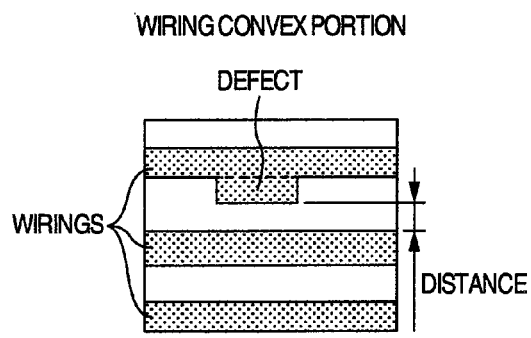

FIG. 8B is an example in the case where a convex portion occurs on a wiring (circuit component), i.e., an example in the case where the wiring becomes thick. If the wiring becomes extremely thick, there arises a danger of developing a short circuit with an adjacent wiring. Also, there is a possibility that the stray capacity with the adjacent wiring increases, thereby deteriorating signal propagation performance of the wiring. In view of this situation, the distance between the convex portion of the defect and the adjacent wiring (circuit component) is measured, then judging the criticality of the convex-portion defect by using this measurement value. Incidentally, it is possible that a convex-portion defect like this is regarded as being a certain type of the foreign-substance defect. However, the material of the foreign substance is different from that of the wiring (circuit component); whereas the material of the convex portion is the same as that of the wiring (circuit component).

Figure 8C:
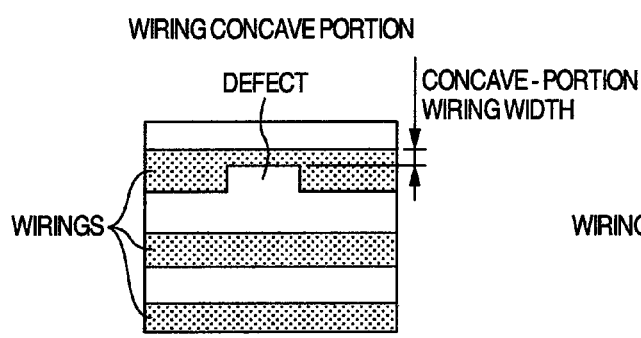
Figure 8D:
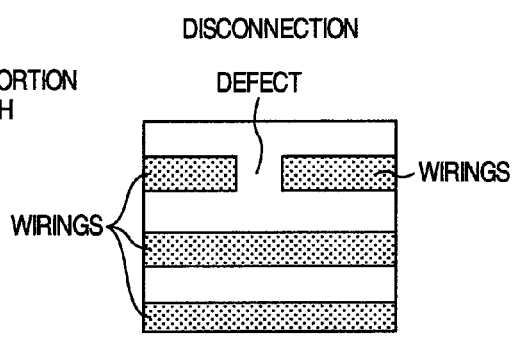

FIG. 8C is an example in the case where a concave portion occurs in a wiring (circuit component), i.e., an example in the case where the wiring becomes thin. If the wiring becomes thin, resistance of the wiring becomes large, thereby deteriorating the signal propagation performance of the wiring. If the wiring becomes extremely thin, the wiring is disconnected. FIG. 8D is an example in the case of the defect that the wiring is disconnected. In view of this situation, in the case of the concave-portion defect of the wiring, wiring width of the concave portion of the wiring is measured, then judging the criticality of the concave-portion defect by using this measurement value. Incidentally, the disconnection of the wiring corresponds to the case where the wiring width of the concave portion of the wiring becomes equal to "0".

Figure 8E:
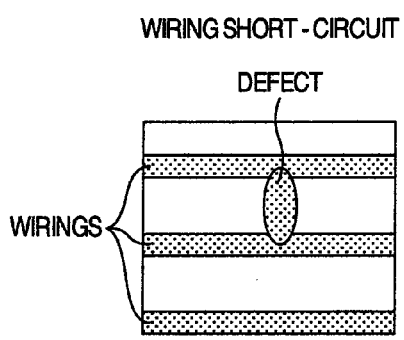

FIG. 8E is an example in the case of the wiring short-circuit defect. The wiring short-circuit occurs in the case where, in the foreign-substance defect in FIG. 8A, the foreign substance is so large as to across the two wirings. Also, the wiring short-circuit occurs in the case where, in the wiring convex-portion defect in FIG. 8B, the convex portion is in contact with the adjacent wiring. Usually, a wiring short-circuit defect like this gives rise to a false operation of the wiring signal in many cases. Accordingly, the maximum criticality is assigned to the wiring short-circuit defect.

FIG. 9 is a diagram for illustrating an example of the configuration of the criticality judgment criterion data. As illustrated in FIG. 9, the criticality judgment criterion data includes data such as defect type, measurement item, layer of each defect, layer of design data, judgment threshold value, and set criticality.

Here, the defect type is each of the defect types explained using FIG. 8A to FIG. 8E. The measurement item is an item of the data acquired for judging the criticality of each defect of the defect types, the layer of each defect is a layer which includes each defect, the layer of design data is a layer which includes design data on a circuit component which becomes the target when determining relative position relationship between each defect and the circuit component, the judgment threshold value is a criterion value for judging the criticality of each defect, and the set criticality is a value for indicating the criticality set in accordance with the measurement value of the measurement item and the judgment threshold value for each defect.

Additionally, in FIG. 9, although the layer of each defect is "L2" alone, "L1" or "L3" may also be qualified as the layer of each defect. Also, in FIG. 9, as the defect types, the disconnection and wiring short-circuit are regarded as special forms of the foreign substance, wiring convex portion, or wiring concave portion. Namely, the disconnection and wiring short-circuit are not classified into the independent defect types.

Based on the criticality judgment criterion data of the configuration as described above, with respect to a defect detected in a certain layer, not only the threshold values for the relative position relationship between this defect and a circuit component (such as a wiring) belonging to a layer which is the same as this layer, but also the threshold values for the relative position relationship between this defect and a circuit component belonging to a layer which is different from this layer, and the criticalities in accordance with these relative position relationships can be appropriately set as the data which is determined empirically. For example, this setting may be performed as follows: Namely, as illustrated in FIG. 9, with respect to the wiring in the same layer L2, the foreign substance in the layer L2 is judged as being the significant defect (whose criticality is equal to "2") if the separation distance therebetween becomes smaller than 70 nm. With respect to the wiring in the different layer L3, however, the foreign substance in the layer L2 is not judged as being the significant defect (whose criticality is equal to "2") unless the separation distance therebetween becomes smaller than 40 nm. Also, like the wiring convex-portion defect, the criticality to be set therefor may be changed depending on whether the circuit component (such as a wiring) belongs to the same layer as the defect, or belongs to the different layer from the defect.

Also, by making a check of the criticality judgment criterion data, it becomes possible to specify another layer on which, for each defect type in each layer, a defect in a certain layer will be able to exert its influence. Consequently, at the step S13 of the pattern-defect analysis steps (refer to FIG. 13), by making reference to the criticality judgment criterion data storage unit 111 in which the criticality judgment criterion data is stored, it becomes possible for the data processing unit 10 of the pattern-defect analysis equipment 1 to judge whether or not there exists another layer in which the defect criticality should be judged.

As having explained so far, according to the present embodiment, as illustrated in FIG. 5A and FIG. 5B, the pattern-defect analysis equipment 1 (the data processing unit 10) performs the matching and the alignment between the review image 61 including the defect f and the image (i.e., the self-layer design data 71) of the circuit component (such as a wiring) belonging to the same layer as that of the defect f. Moreover, based on this alignment, the equipment 1 determines the distance between the defect f and the circuit component, and further, determines the distance between the defect f and the circuit component belonging to another layer. As a consequence, it becomes possible to obtain the higher-accuracy distances between the defect f and the circuit components.

Furthermore, the pattern-defect analysis equipment 1 (the data processing unit 10) acquires the criticality of the defect on the basis of the distances between the defect f and the circuit components acquired as described above and the criticality judgment criterion data illustrated in FIG. 9. This scheme allows the analysis equipment 1 to acquire not only the criticality on a circuit component belonging to the same layer as the one which includes the defect, but also the criticality on a circuit component belonging to the different layer therefrom. As a consequence, it becomes possible to obtain the higher-reliability criticality resulting from taking into consideration the fact that the defect's influence will be exerted on another layer.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A pattern-defect analysis equipment, comprising:
a surface-observation-image acquisition unit for acquiring a surface observation image of a partial region on surface of a substrate on which patterns of a plurality of layers are formed; and
a data processing unit for storing design data about configurations of said patterns formed in each layer of said substrate, and judging criticality of a pattern defect included in said surface observation image of said partial region of said substrate acquired by said surface-observation-image acquisition unit;
wherein said data processing unit
acquires, via said surface-observation-image acquisition unit, a surface observation image of said partial region in a layer that includes said pattern defect, said partial region including said pattern defect,
compares said acquired surface observation image with a predetermined reference image, and thereby extracts an image of said pattern-defect portion as a defect image from said surface observation image, said predetermined reference image including no pattern defect,
performs an alignment between a self-layer design pattern image and said surface observation image by performing an image matching between said self-layer design pattern image and said surface observation image, said self-layer design pattern image being generated from said design data, said design data belonging to a layer which is identical to said layer that includes said pattern defect with respect to said partial region corresponding to said surface observation image,
generates a first synthesized image based on result of said alignment, said first synthesized image being generated by synthesizing said defect image with an another-layer design pattern image, said another-layer design pattern image being generated from said design data, said design data belonging to a layer which is different from said layer that includes said pattern defect with respect to said partial region corresponding to said surface observation image,
determines data based on said first synthesized image, said data indicating a first relative position relationship between said pattern defect and a pattern, said pattern belonging to said layer which is different from said layer that includes said pattern defect, and
judges said criticality based on said determined data indicating said first relative position relationship, said pattern defect exerting said criticality on said pattern, said pattern belonging to said layer which is different from said layer that includes said pattern defect.

2. The pattern-defect analysis equipment according to claim 1, wherein
said data processing unit, further,
generates a second synthesized image based on said result of said alignment, said second synthesized image being generated by synthesizing said defect image with said self-layer design pattern image,
determines data based on said second synthesized image, said data indicating a second relative position relationship between said pattern defect and a pattern, said pattern belonging to said layer which is identical to said layer that includes said pattern defect, and
judges said criticality based on said determined data indicating said second relative position relationship, said pattern defect exerting said criticality on said pattern, said pattern belonging to said layer which is identical to said layer that includes said pattern defect.

3. The pattern-defect analysis equipment according to claim 1, wherein
said data processing unit, further,
displays said first synthesized image on a display device, said first synthesized image being generated by synthesizing said defect image with said another-layer design pattern image.

4. A pattern-defect analysis method used in a pattern-defect analysis equipment, comprising: a surface-observation-image acquisition unit for acquiring a surface observation image of a partial region on the surface of a substrate on which patterns of a plurality of layers are formed; and a data processing unit for storing design data about configurations of said patterns formed in each layer of said substrate, and judging criticality of a pattern defect included in said surface observation image of said partial region of said substrate acquired by said surface-observation-image acquisition unit, the pattern-defect analysis method comprising steps of:
acquiring, via said surface-observation-image acquisition unit, a surface observation image of said partial region in a layer that includes said pattern defect, said partial region including said pattern defect;
comparing said acquired surface observation image with a predetermined reference image that includes no pattern defect, and thereby extracting an image of a pattern-defect portion as a defect image from said acquired surface observation image,
performing an alignment between a self-layer design pattern image and said acquired surface observation image by performing an image matching between said self-layer design pattern image and said acquired surface observation image, wherein said self-layer design pattern image is generated from said design data, said design data belonging to said layer that includes said pattern defect with respect to said partial region corresponding to said acquired surface observation image;

generating a first synthesized image based on a result of said alignment, wherein: said first synthesized image is generated by synthesizing said defect image with an another-layer design pattern image, and said another-layer design pattern image is generated from said design data that belongs to a layer which is different from said layer that includes said pattern defect with respect to said partial region corresponding to said acquired surface observation image;

determining data based on said first synthesized image, wherein said data indicates a first relative position relationship between said pattern defect and a pattern that belongs to said layer which is different from said layer that includes said pattern defect; and judging said criticality based on said determined data indicating said first relative position relationship, said pattern defect exerting influence on said criticality on said pattern that belongs to said layer which is different from said layer that includes said pattern defect.

5. The pattern-defect analysis method according to claim 4, further comprising steps of:

generating a second synthesized image based on said result of said alignment, wherein said second synthesized image is generated by synthesizing said defect image with said self-layer design pattern image;

determining data based on said second synthesized image, wherein said data indicating a second relative position relationship between said pattern defect and a pattern that belongs to said layer that includes said pattern defect; and judging said criticality based on said determined data indicating said second relative position relationship, said pattern defect exerting influence on said criticality on said pattern that belongs to said layer that includes said pattern defect.

6. The pattern-defect analysis method according to claim 4, further comprising the step of:

displaying said first synthesized image on a display device, wherein said first synthesized image is generated by synthesizing said defect image with said another-layer design pattern image.

7. A pattern-defect analysis program embodied in a non-transitory computer readable medium for causing a processor of a computer to execute functions for operations of a pattern-defect analysis equipment, said pattern-defect analysis equipment, comprising:

a surface-observation-image acquisition unit for acquiring a surface observation image of a partial region on the surface of a substrate on which patterns of a plurality of layers are formed; and a data processing unit for storing design data about configurations of said patterns formed in each layer of said substrate, and judging criticality of a pattern defect included in said surface observation image of said partial region of said substrate acquired by said surface-observation-image acquisition unit; wherein said pattern-defect analysis program is embodied in said non-transitory computer readable medium to cause said data processing unit to execute functions, including functions to:

acquire, via said surface-observation-image acquisition unit, a surface observation image of said partial region in a layer that includes said pattern defect, said partial region including said pattern defect;

compare said acquired surface observation image with a predetermined reference image that includes no pattern defect, and thereby extract an image of said pattern-defect portion as a defect image from said surface observation image;

perform an alignment between a self-layer design pattern image and said acquired surface observation image by performing an image matching between said self-layer design pattern image and said acquired surface observation image, wherein said self-layer design pattern image is generated from said design data that belongs to said layer that includes said pattern defect with respect to said partial region corresponding to said acquired surface observation image;

generate a first synthesized image based on a result of said alignment, wherein: said first synthesized image is generated by synthesizing said defect image with an another-layer design pattern image, and said another-layer design pattern image is generated from said design data that belongs to a layer which is different from said layer that includes said pattern defect with respect to said partial region corresponding to said acquired surface observation image;

determine data based on said first synthesized image, wherein said data includes a first relative position relationship between said pattern defect and a pattern that belongs to said layer which is different from said layer that includes said pattern defect; and judging said criticality based on said determined data indicating said first relative position relationship, said pattern defect exerting influence on said criticality on said pattern that belongs to said layer which is different from said layer that includes said pattern defect.

8. The pattern-defect analysis program according to claim 7, wherein said data processing unit is caused to further execute functions, including functions to:

generate a second synthesized image based on said result of said alignment, wherein said second synthesized image is generated by synthesizing said defect image with said self-layer design pattern image;

determine data based on said second synthesized image, wherein said data indicates a second relative position relationship between said pattern defect and a pattern that belongs to said layer that includes said pattern defect; and judge said criticality based on said determined data indicating said second relative position relationship, said pattern defect exerting influence on said criticality on said pattern that belongs to said layer that includes said pattern defect.

9. The pattern-defect analysis program according to claim 7, wherein said data processing unit is caused to further execute a function to:

display on a display device said first synthesized image that is generated by synthesizing said defect image with said another-layer design pattern image.

* * * * *